(12) United States Patent
Pickering et al.

(10) Patent No.: US 8,774,390 B2
(45) Date of Patent: *Jul. 8, 2014

(54) METHOD AND APPARATUS FOR HANDLING A TELEPHONE CALL

(75) Inventors: Richard Pickering, Whitchurch (GB); Ashley Unitt, Whitchurch (GB); Jonathan Grant, Whitchurch (GB); Anthony Buxton, Whitchurch (GB)

(73) Assignee: NewVoiceMedia Limited, Basingstoke (GB)

( * ) Notice: Subject to any disclaimer, the term of this patent is extended or adjusted under 35 U.S.C. 154(b) by 80 days.

This patent is subject to a terminal disclaimer.

(21) Appl. No.: 13/370,284

(22) Filed: Feb. 9, 2012

(65) Prior Publication Data

US 2012/0140910 A1    Jun. 7, 2012

Related U.S. Application Data

(63) Continuation of application No. 11/942,279, filed on Nov. 19, 2007, now Pat. No. 8,139,753.

(60) Provisional application No. 60/860,450, filed on Nov. 20, 2006.

(51) Int. Cl.
*H04M 5/10* (2006.01)

(52) U.S. Cl.
USPC ............ 379/265.02; 379/110.01; 379/218.01; 379/265.14; 379/88.19

(58) Field of Classification Search
USPC ............ 379/265.02, 110.01, 218.01, 265.14, 379/88.19; 705/14.53
See application file for complete search history.

*Primary Examiner* — Joseph J Nguyen
(74) *Attorney, Agent, or Firm* — Galvin Patent Law LLC; Brian R. Galvin

(57) ABSTRACT

A system for handling a telephone call within a telephone network, comprising a multi-tenanted CTI server within a telecommunications network adapted to receive telephone calls on behalf of a plurality of outlets, wherein the CTI server is adapted for queuing an incoming call in the network when no agent is available and is further adapted to forward an incoming call to an agent when the agent becomes available. The CTI server is configured to use an indicia received with the received call to identify the caller and to retrieve a profile of the caller by matching the indicia to a previously-stored indicia in a call history database collocated with the CTI server, the profile comprising at least a plurality of previous orders processed by an outlet on behalf of the caller, the profile being used to provide priority call handling for certain callers.

4 Claims, 2 Drawing Sheets

METHOD AND APPARATUS FOR HANDLING A TELEPHONE CALL

RELATED APPLICATIONS

This application is a continuation of U.S. patent application Ser. No. 11/942,279, entitled "Method And Apparatus For Handling A Telephone Call", filed on Nov. 19, 2007, now U.S. Pat. No. 8,139,753 which claims priority under 35 U.S.C. §119 to U.S. Provisional Patent Application No. 60/860,450, filed Nov. 20, 2006, also entitled "Method And Apparatus For Handling A Telephone Call", by inventors Richard Pickering, Ashley Unitt, Jonathan Grant and Anthony Buxton.

BACKGROUND

1. Field of the Invention

The invention relates to a method and apparatus for handling a telephone call, especially for use in the context of a fast food delivery service and other similar businesses.

2. Background of the Invention

It is very common for customers to order a product over the telephone. One particular industry where this is a very widespread activity is for home delivery of fast food, for example pizzas. The characteristics of this business place significant constraints on the handling of customer calls. Thus frequently there is no pre-existing arrangement (e.g. a contract) that ties the customer to any given pizza delivery outlet. Rather, the customer will telephone one establishment, but if their call is not handled swiftly, they may then telephone another rival establishment. If they receive good service from this rival establishment, they may call the rival first next time they need a pizza. In other words, there is high customer mobility between competing businesses, and accordingly customer service standards have to be very high to retain customers. This particular applies to the handling of incoming telephone calls, which represent the first point of contact with the customer (when it is easiest for the customer to retract and go elsewhere). Existing systems generally do not provide a mechanism to reward and retain loyal customers.

Another problem is that the call rate into pizza delivery outlets may be highly bunched. For example, if there is a popular event on television, there may be a sharp peak in calls immediately before or after the event, or during an interval (e.g. an advertising break). These variations in incoming call rate exacerbate the problem of providing a good telephone service to all customers.

A further consideration is that most pizza delivery establishments are small businesses. They cannot afford large-scale call handling facilities, either in terms of the infrastructure, or the staff to run them.

It is also common for such pizza establishments to be franchise operations. The franchisor would like customers to experience a common customer interface irrespective of which franchisee they contact in order to build brand value for the franchise, but this is difficult with multiple franchisees each operating a highly local service. There is also a concern amongst franchisors that some franchisees might hide part of their business from the franchisor (in order to avoid royalty payments).

Accordingly, there are significant challenges in providing good telephone service for pizza delivery outlets and other such businesses.

SUMMARY OF THE INVENTION

One embodiment of the invention provides a method of handling a telephone call. The method includes providing a multi-tenanted computer-telephony integration (CTI) server. The different tenants correspond to various outlets for one or more product or service offerings. The CTI server is located outside the customer premises for the various outlets. The method further includes receiving a call directed to one of the outlets and using CLI for the call by the CTI server to identify the calling party and a customer profile for the calling party. The customer profile is based on previous orders. The method further includes queuing the call within the network if it is determined that the outlet is unable to currently service the call, and forwarding the call to the outlet to process the call. The CTI server uses the customer profile for providing priority call handling treatment for loyal customers. Such a method may be used in a fast food delivery business such as pizza ordering or in any other appropriate business.

In one embodiment, the customer profile is used to provide a marketing message dependent on the customer profile. The marketing message may also be dependent on real-time information from an external source, for example weather data, current product availability, etc. The marketing message may also be dependent on the time spent in the queue. In one embodiment, the outlet is informed of the marketing message heard by the caller. For example, this enables the outlet to hear if the caller has heard about a particular promotion.

In one embodiment, the priority call handling treatment includes accelerating the progress of the call through a queue of calls. Therefore customers who are loyal have their calls answered relatively early.

In one embodiment, the CTI server bridges the call with a call placed from the CTI server to an outlet. In other words, there is a first call arriving from the caller at the CTI server, and a second call from the CTI server to the pizza outlet (or other call handling facility). The first and second calls are bridged so that the existence of two separate calls is transparent to the caller. However, because the CTI server retains a presence in the two calls, it can collect call statistics, record the call, etc. The call recording may be performed by the CTI server itself or some device under the control of the CTI server, such as an IVR.

In one embodiment, automated order status is provided to repeat callers (since they are frequently calling about order status). This frees up human agents to take calls for new orders. In one embodiment, the method further comprises maintaining a call history database, and comparing the CLI with the call history database to identify a repeat caller.

In one embodiment, the method further comprises maintaining a local copy at the CTI server of customer profile data and accessing remote order data and/or product availability data for handling the call. Having the local copy at the CTI server of the customer profile data allows the CTI server to generally have a quicker response time for call processing. However order data and/or product availability data are generally stored at the various outlets themselves, since these change more frequently than customer profile data (and so would be harder to mirror in the network).

In one embodiment, the CTI server collects aggregate statistics for calls to all the various outlets. These aggregated statistics can be made available for management purposes, for example to a franchisor, where the various outlets are franchise operations of the franchisor.

Other embodiments of the invention provide a computer program and apparatus for implementing a method such as described above. The computer program may be provided as machine executable instructions on a computer readable medium.

BRIEF DESCRIPTION OF THE DRAWINGS

Various embodiments of the invention will now be described in detail by way of example only with reference to the following drawings.

DETAILED DESCRIPTION

Figure 1:
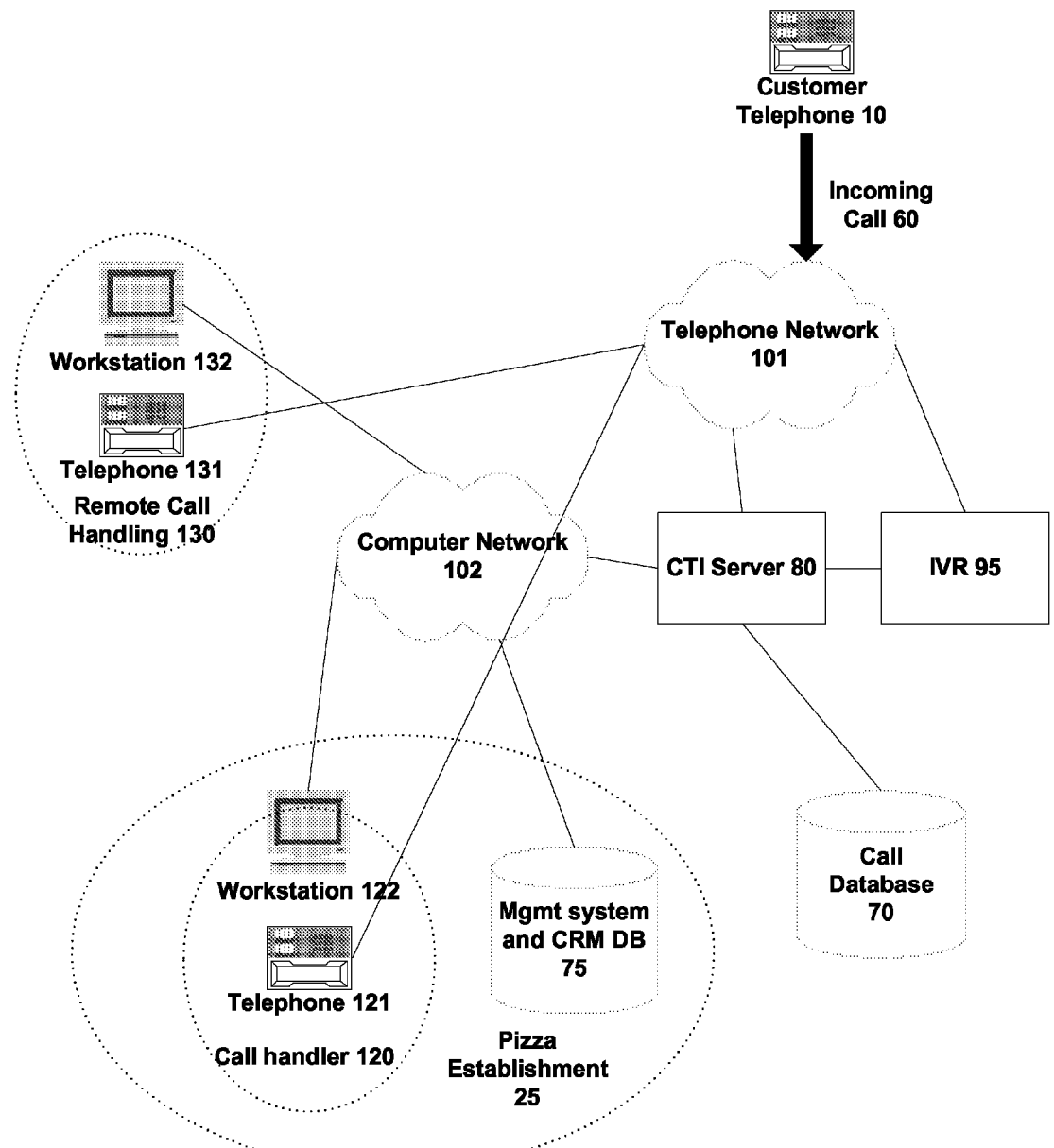
FIG. 1 is a schematic diagram of a CTI system in accordance with one embodiment of the invention.

FIG. 1 is an illustration of a computer-telephony integration (CTI) system in accordance with one embodiment of the invention. A customer 10 makes a call 60 to a pizza establishment 25. The pizza establishment may be part of a chain. There may be a single shared number for all venues in the chain. However, in many cases pizza place 25 will have its own geographic telephone number, in order to emphasize proximity to customer 10.

Call 60 is intercepted within telephone network 101 by CTI server 80 based on the dialed number. The calling number (CLI/ANI) is generally presented to CTI server 80 by the network. In some embodiments, an interactive voice response (IVR) unit 95 is also provided. CTI server 80 may use the IVR to obtain the CLI (if this is not presented by the network), and/or to obtain additional information from caller 10, for example an account number or other identifying or supplemental demographic information.

CTI server 80 can answer call 60 (either directly or indirectly or with the IVR 95) and play an announcement to caller 10. This announcement can be generic across a franchise operation in order to ensure branding consistency, but may also be customizable according to the requirements of the particular establishment to which a call is directed. For example, there may be a franchise-wide promotion of free garlic bread for an order above a certain value. All callers may be played a relevant marketing message about this promotion. However, if a management system 75 at a particular establishment detects that the particular establishment has run out of garlic bread, it can notify CTI server 80, which can then stop playing the marketing message in relation to that promotion to callers for that particular venue.

Information about all incoming calls is stored in call database 70 (and may subsequently be downloaded to management system 75 of relevant pizza establishments). Call database 70 is network-based; in other words, it is located away from customer premises 25. In one implementation, call database 70 may be co-located with CTI server 80. Note that call database 70 may be implemented by one or more physical databases as appropriate.

The call database allows CTI server 80 to see if the CLI for a new call matches the CLI for a call recently received. In this case, there is a high likelihood that caller 10 is inquiring about the delivery status of an earlier order. Therefore, CTI server 80 can interrogate management system 75 of a relevant pizza delivery establishment to determine order status. CTI server 80 can then relay relevant information to caller 10, for example, "your order has been dispatched with the delivery rider and should be delivered within the next 10 minutes". Caller 10 may then be asked if any further service is required. This automated detection of recent callers allows calls that have a high probability of not representing new orders to be handled automatically without involving a human agent.

CTI server 80 may also access information associated with caller 10 from CRM database 75 of a relevant pizza establishment. The information may be accessed based for example on the calling number or perhaps account number of caller 10. If the system does not recognize the calling number, it may use IVR 95 to ask customer 10 if she has previously dealt with establishment 25. If not, then no CRM data will be available (but may now potentially be first collected at this point). However, if caller 10 is an established customer, caller 10 may be prompted to enter more information to allow the system to locate her CRM data. For example, caller 10 may be asked to enter an alternative phone number, such as a home phone number, if for example caller 10 is calling from her work.

In one embodiment, the information in CRM database 75 is processed to provide a customer profile. The customer profile might reflect information such as the overall value of the customer, participation in special promotions etc. CTI server 80 may then use the customer profile (rather than the raw CRM data) for handling the call. This allows applications running in conjunction with CTI server 80 to avoid accessing and processing all raw CRM data, which may be relatively time-consuming for real-time call handling.

In preferred embodiment of the invention, a copy of the CRM data is uploaded from database 75 to CTI server 80. This upload may be performed on a regular basis, for example daily or weekly; in some cases the CRM upload may not be a fully structured database, but may have a simpler file structure having a standardized data format, such as a spreadsheet (in which case CRM database 75 may be implemented by a spreadsheet file). For example, the spreadsheet may comprise a set of telephone numbers and a customer profile for each telephone number.

Having a copy of the CRM data (in whatever format) local to CTI server 80 provides faster response times for real-time call handling. In general however, CTI server 80 goes across the network to management system 75 when checking order information and other relevant information (as described above). This is because order information and other such data are updated frequently at a pizza establishment 25 (and so it is more difficult and involves more network traffic to maintain a fully up-to-date copy at CTI server 80).

The customer information (whether a profile or some other form of CRM data) may be used to determine, for example, whether customer 10 is a high value customer based on previous orders. This may lead to a call's 60 being given high priority for being passed through to a live agent. The system may also detect whether caller 10 always makes the same order. In such cases, the system might prompt a caller with his standard order, and ask if him if he wants to repeat that order.

Note that CTI server 80 has a much larger capacity for incoming calls than any single pizza establishment generally would. Consequently, callers 10 avoid getting a busy tone, but rather can be entered into a queue, and played appropriate marketing or informational messages as suggested above. Callers 10 can also be offered incentives to stay in queue—for example, money off if they are queued for more than a certain period (this period might be adjusted in accordance with current queue length and overall call volume).

CTI server 80 also has the capacity to record calls and to collect call statistics. This is attractive to franchisors. For example, if a particular establishment reports low sales, a franchisor can see whether the low sales are due to a low number of customer contacts or to a poor completion rate for calls. If the latter, the recordings of various calls can be used to investigate the poor completion rate. This information can then help improve the business performance of the relevant venue 25 (or to identify any fraud).

Assuming that incoming call 60 is not a repeat call (for example, if no call has been received from that caller within the last hour), CTI server 80 attempts to forward call 60 to a desired pizza establishment 25 (in accordance with the dialed number). If establishment 25 is already busy handling calls, CTI server 80 may queue the call 60. Another possibility is to overflow call 60 to a separate call handling facility 130 (that is, different from pizza establishment 25). Such an overflow operation may be performed immediately, or only after customer 10 has been held in a queue for a certain time period (which may be dependent upon a relevant customer profile— e.g. high priority customers might be overflowed more promptly).

In one embodiment, call handling facility 130 comprises a call center 130, which may serve multiple pizza establishments, thereby helping to smooth out variations in call rate on a statistical basis. Such a call center may also serve other businesses, not just pizza delivery. This allows most efficient use of telephone operatives. A further possibility is to overflow calls to other employees of a receiving firm such as a pizza chain, for example administrative employees who are at home. These employees may be paid on a stand-by basis as home-workers to provide an overflow capacity. Note that in some cases, a pizza establishment may outsource all incoming calls to a call center (rather than having any staff in pizza establishment 25 for this role). This then allows the staff at pizza delivery venue 25 to concentrate on order fulfillment.

In one embodiment, CTI server 80 detects if a customer 10 abandons a call before being connected with an agent. CTI server 80 may then select to call customer 10 back directly (based on the CLI) and connect the customer 10 immediately to a live agent.

In general CTI server 80 sets up a separate call to an agent who is to handle call 60 (whether at pizza establishment 25, at a separate call handling facility 130, or elsewhere). This call is then bridged with the original incoming call 60 from customer 10 to allow customer 10 to talk to the agent. Note that since CTI server 80 is still involved in call 60 (rather than linking customer 10 directly to the agent and then dropping out altogether), CTI server 80 can collect call statistics, perform call recording, etc.

When CTI server 80 forwards a call 60 to an agent, it can also provide information associated with the call 60 to a workstation screen associated with the agent (e.g. work station 122 for a call to telephone 121 or to workstation 132 for a call to telephone 131). Note that this may occur even if call 60 is being directed to a homeworker (provided that the homeworker has the facility for separate incoming voice and data, such as broadband or some other suitable Internet connection).

The information provided to the agent receiving call 60 can lead to better and quicker handling of call 60. For example, based on the CLI information, the customer delivery address may be retrieved from a customer database 75. The agent then only needs to confirm the address with caller 10 (rather than having to enter a new address). The agent may also be presented with other information about caller 10 from the CRM database 75, such as that customer 10 should have priority treatment for being a regular and/or high value customer, etc.

The agent may also provide a caller 10 with customer specific offers (as prompted by the application running on CTI server 80). These may be based on customer information stored in CRM database 75. For example, if a particular customer always orders medium size pizzas, she may be offered a special trial deal to upgrade to a larger size. Another possibility is that the offer depends on an overall call experience of caller 10. For example, if the system indicates that caller 10 has been queuing for several minutes, the agent might be prompted to offer the customer 10 free garlic bread as compensation for this delay.

After the agent takes an order, this is entered via user workstation 122, 132 into management system 75. This is used by pizza establishment 25 to manage and track orders. Information from management system 75 can also be provided to agents handling calls, for example in relation to current queue times. Another possibility is to notify agents if certain products (e.g. pizza toppings) run out, so that customers 10 can be offered a suitable alternative.

In one embodiment, CTI server 80 and associated databases are multi-tenanted, in that the same hardware is shared by multiple different organizations (such as different pizza establishments 25). Each establishment 25 has access to its own data regarding call statistics and so on. A managing entity (e.g. a franchisor or head office for a group of outlets) may be provided with access to aggregate data for all the different tenants. It will be appreciated that this collective approach allows the cost of more advanced facilities (such as call recording and/or voice recognition) to be shared across a number of establishments.

Figure 2:
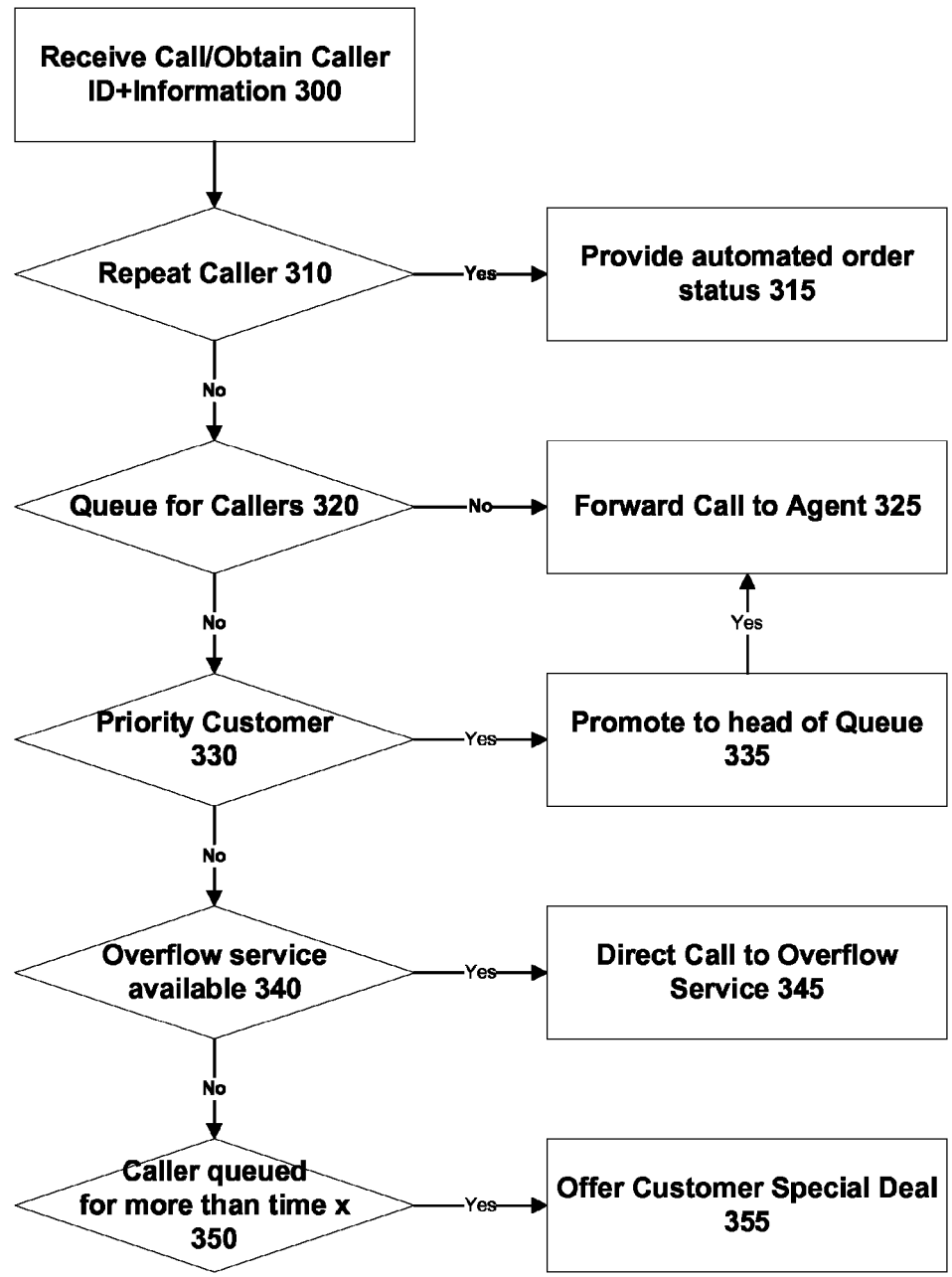
FIG. 2 is a schematic flowchart of call handling for a pizza delivery service in accordance with one embodiment of the invention.

FIG. 2 illustrates a method for handling a call 60 in accordance with a preferred embodiment of the invention such as described above. This method may be implemented using a computer telephony system shown in FIG. 1 or any other appropriate system. It will be appreciated that many variations are possible of the methodology of FIG. 2.

The method commences with receiving an incoming call 60 from a caller 10 and obtaining caller identification. Caller identification may, for example, comprise a calling line identifier (CLI), also known as automatic number identification (ANI). Another possibility is that an IVR system 95 is used to obtain information identifying a caller 10, such as an account number.

Caller identification information can be used to access information about a specific caller 10. If caller 10 is a repeat caller, then he/she may be played automated information about the status of their current order. In addition, an account number or a telephone number may be used to identify a customer record in a customer relationship management database. Once the appropriate customer record has been identified, the system can now retrieve information (e.g. a profile) from this record for the particular customer 10 making the call 60.

The system now determines how to act based on the caller information. One possibility is that caller 10 may be played a message comprising marketing information of specific relevance to the specific caller 10 (not shown in FIG. 2). For example, the marketing message may indicate that a product that the customer 10 has previously purchased is currently on special offer. The CRM information may also be used to identify priority customers 10 who can then be routed to the head of a call handling queue.

If a caller 10 is still in a queue, the caller 10 may be routed to an overflow call handling facility (e.g. a call center, and/or homeworkers).

In some implementations, the information provided onto screen 122 of an agent 120 who eventually receives call 60 may include an indication or details of any caller-specific marketing message played to caller 10. For example, if caller 10 has been played a marketing message about a particular promotion, CTI server 80 may prompt (script) the agent to ask the caller 10 if she is interested in pursuing the offer that she has just heard. Another possibility is that the agent is provided with data indicating which caller-specific marketing message was played to a caller 10, so that the agent will be aware of the situation in case the caller 10 asks about a product or service described in the marketing message. If the caller 10 is further delayed in a queue, the agent may be instructed to provide the caller 10 with some special offer as compensation.

It can be seen therefore that call handling can be based on:
a) customer data—e.g. a customer profile; and/or
b) call data—e.g. whether the caller has recently called or has been in a queue for a long time.

The system described above may also have some or all of the following functionality:

- CLI capture—if CLI is not presented, call 60 is intercepted and caller 10 is asked to input his telephone number. Likewise, if the CLI is not recognized, the caller 10 may be asked to input an alternative telephone number (e.g. a home number if he is calling from work or from a mobile device). The entered number is then provided as CLI when call 60 is transferred to a pizza shop. This allows near 100% screen popping plus other relevant functionality.
- VIP caller treatment—VIP callers recognized by their CLI are placed at the front of a queue, ensuring a superb customer service for the most loyal customers.
- No busy tone—usually a shop can only take as many calls as they have inbound telephone channels. Thus if they have 5 channels, the 6th caller gets a busy tone. The present system queues callers in the network so they do not receive a busy tone.
- Queue positions and expected wait times can be announced to callers.
- Automated callback can be provided, such that if a caller hangs up while in a queue (and CLI is available), the system calls the caller 10 back immediately for connection to the first live agent.
- The system operates as a virtual call center providing (a) call statistics such as abandon rates, time to abandon, etc., and (b) call overflow, e.g. to homeworkers with a broadband connection.
- Call recording allows the best practice of best perforating order takers to be analyzed and spread, and protects against fraud.
- The system provides automated status updates for a caller who has recently placed an order, so that they are given an order status update with the option to hold for the shop.
- Average order value can be increased using relevant marketing, e.g. enabling shops to make specific offers to individual customers, based on a) individual customer history (e.g. upsell to large for callers who normally only buy medium), b) customer profile (e.g. market new vegetarian option to vegetarians), c) external information (e.g. market ice cream if weather is hot), d) pizza shop details (e.g. don't promote side salads if these are currently out of stock), e) special offer for callers who have been queued for a long time—(or combination of any of above).
- Consistent branding and standard offers.

The skilled person will be aware of a range of possible modifications of the various embodiments described above—e.g. the techniques described may be applied to other fast food outlets than pizzas, and other customer services, not just fast food delivery. For example, the techniques described may be applied to tire and/or exhaust fitting businesses, and to a wide range of other commercial, retail and service offerings. Accordingly, the present invention is defined by the claims and their equivalents.

What is claimed is:

1. A method of handling a telephone call within a telephone network, the method comprising the steps of:
   (a) providing a multi-tenanted computer-telephony integration (CTI) server located within a telecommunications network and adapted to receive telephone calls via a telephony interface on behalf of a plurality of outlets offering products or services to callers, the CTI server located outside the customer premises of the various outlets;
   (b) receiving a telephone call to one of the outlets at the telephony interface of the CTI server;
   (c) using an indicia received with or substantially at the same time as the received call to identify a calling party and to retrieve a profile of the calling party by matching the indicia to a previously-stored indicia in a call history database collocated with the CTI server, wherein the profile comprises at least a plurality of previous orders processed by one or more of the outlets on behalf of the calling party;
   (d) if no agent is available to immediately receive the telephone call, queuing the call at the CTI server; and
   (e) when an agent becomes available, forwarding the call from the CTI server to a telephony device used by an available agent; wherein the CTI server uses the profile for providing priority call handling for high value callers, wherein a caller is determined to be high value based at least on an attribute obtained from the profile of the caller, wherein the profile is used to provide a targeted marketing message to the calling party, and wherein the marketing message is based at least in part on the time spent by the calling party in queue.

2. The method of claim 1, wherein the marketing message is based on current availability of a product or service from an outlet.

3. A system for handling a telephone call within a telephone network, comprising:
   a multi-tenanted computer-telephony integration (CTI) server located within a telecommunications network and adapted to receive telephone calls via a telephony interface on behalf of a plurality of outlets offering products or services to callers, the CTI server located outside the customer premises of the various outlets;
   wherein the CTI server is further adapted for queuing an incoming call in the telecommunications network when no agent is available to receive the call;
   wherein the CTI server is further adapted to forward an incoming call to an agent when the agent becomes available;
   wherein the CTI server is configured to use an indicia received with or substantially at the same time as the received call to identify a calling party and to retrieve a profile of the calling party by matching the indicia to a previously-stored indicia in a call history database collocated with the CTI server, wherein the profile comprises at least a plurality of previous orders processed by one or more of the outlets on behalf of the calling party; and
   wherein the CTI server uses the profile to provide priority call handling for high value callers, wherein a caller is determined to be high value based at least on an attribute obtained from the profile of the caller, wherein the profile is used to provide a targeted marketing message to the calling party, and wherein the marketing message is based at least in part on the time spent by the calling party in queue.

4. The system of claim 3, wherein the marketing message is based on current availability of a product or service from an outlet.

\* \* \* \* \*